United States Patent [19]

Heller et al.

[11] 3,822,728

[45] July 9, 1974

[54] APPARATUS FOR FLATTENING AND TRIMMING THE LEADS OF ELECTRICAL COMPONENTS

[75] Inventors: Martin G. Heller, 68 Harvey Dr., Short Hills, N.J. 07078; Donald D. Kelly, Roseland; Richard L. Cheney, Lake Hiawatha, both of N.J.

[73] Assignee: said Heller, by said Kelly and Cheney

[22] Filed: June 22, 1973

[21] Appl. No.: 372,639

[52] U.S. Cl. .............................. 140/1, 72/DIG. 10

[51] Int. Cl. .......................... B21f 5/00, B21f 11/00

[58] Field of Search ............ 29/203 D; 72/DIG. 10; 140/1, 2, 123, 139, 140, 71

[56] References Cited

UNITED STATES PATENTS

| | | | |
|---|---|---|---|
| 371,463 | 10/1887 | Knapp | 140/1 |
| 3,064,708 | 11/1962 | Kulicke | 72/DIG. 10 |
| 3,396,758 | 8/1968 | Hall | 140/1 |

*Primary Examiner*—Charles W. Lanham
*Assistant Examiner*—E. M. Combs
*Attorney, Agent, or Firm*—Ralph R. Roberts

[57] ABSTRACT

In apparatus for processing electrical components characterized as having leads extending from both ends of the body member there is provided a transport wheel which receives the components one at a time and while nested in notches in the wheel carries them to lead flattening and cutting dies where the leads are flattened to a determined degree and cut. At a later station these flattened leads are trimmed and/or shaped to the precise desired length and/or configuration.

16 Claims, 10 Drawing Figures

APPARATUS FOR FLATTENING AND TRIMMING THE LEADS OF ELECTRICAL COMPONENTS

BACKGROUND OF THE INVENTION

1. Field of the Invention

With reference to the classification of art as established by the U.S. Patent Office the present invention pertains to the general Class entitled, "Wireworking" (Class 140) and the subclass thereunder entitled, "combined machines" (subclass 1).

2. Description of the Prior Art

The de-reeling, trimming leads to length and bending of the leads of electrical components having leads extending from both ends of their bodies is, of course, well known. To a more-or-less extent three patents assigned to the assignee of this invention pertain to the equipment shown in this invention. U.S. Pat. No. 3,396,758 to R. L. HALL as issued on Aug. 13th, 1968 shows transporting wheel mechanism and a chute delivery similar to the component transport system as used in this application. The HALL patent and U.S. Pat. No. 3,548,998 as issued on Feb. 8th, 1972 to MARTIN G. HELLER, the reference assignee, is associated with equipment directed toward transistors whose leads extend from the bottom of the transistors. Equipment for dereeling electrical components is shown in U.S. Pat. No. 3,701,298 as issued on Oct. 31st, 1972 to HELLER and KELLY and pertains to equipment for processing electrical components having leads extending from both ends of the components. These components have their leads cut to length and bent to one of many configurations, many of which are made for mounting the component in a printed circuit board system.

The soldering of these leads, often delicate, is often a problem to insure that a positive solder connection is made and while doing so that the component has not been damaged. It has been found that a flattened lead provides much more surface for the attraction of solder as well as reducing soldering time because of the thinness of the wire, hence, the present invention provides apparatus wherein both leads of the electrical component are flattened to a determined extent of thickness and length. This flattening operation is performed substantially simultaneously on each lead by a flattening die pair, each pair of which is adjustably movable toward or away from the component guide plates on the transport wheel.

SUMMARY OF THE INVENTION

This invention may be summarized at least in part with reference to its objects.

It is an object of this invention to provide, and it does provide, apparatus for receiving electrical components having a lead extending from both ends of its body and in a transport wheel to bring the leads in way of flattening dies whereat the leads are flattened to a determined degree and are cut to a determined length.

It is an object of this invention to provide, and it does provide, processing apparatus wherein electrical components having wire leads extending from both ends of their bodies are received in a guide chute and at the end of the chute each end of the body is guided into flanges of a transport wheel and with the leads carried in notches therein the leads are brought in way of a combination flattening and cutting die pair where the leads are precisely flattened to a determined thickness and a selected length.

From a delivery chute electrical components having leads extending from both ends are fed to a transport wheel having two flange portions. These flanges are adjustably spaced so as to engage the component bodies at their ends and their wire leads in spaced notches therein. The wheel is rotated in an intermittent manner to bring the components to a vertical or top position whereat a combined flattening and cutting die pair is provided for each component. Each lead of the component is substantially simultaneously first flattened and then with the same rotation of an eccentric drive which actuates the upper die of the pair each component lead is cut. From this station the components may be delivered to conventional further trimming and/or forming dies from which they are then delivered to a discharge means for accumulation.

In addition to the above summary the following disclosure is detailed to insure adequacy and aid in understanding of the invention. This disclosure, however, is not intended to prejudice that purpose of a patent which is to cover each new inventive concept therein no matter how it may later be disguised by variations in form or additions of further improvements. For this reason there has been chosen a specific embodiment of the apparatus for flattening and trimming the leads of electrical components as adopted for use on components having leads extending from both ends of the body and showing a preferred means for receiving, transporting and flattening the wire leads. This specific embodiment has been chosen for the purposes of illustration and description as shown in the accompanying drawings wherein:

BRIEF DESCRIPTION OF THE DRAWINGS

In the following description and in the claims various details will be identified by specific names for convenience; these names, however, are intended to be generic in their application. Corresponding reference characters refer to like members throughout the several figures of the drawings.

The drawings accompanying and forming part of, this specification disclose certain details of construction for the purpose of explanation of the broader aspects of the invention, but it should be understood that structural details may be modified in various respects without departure from the concept and principles of the invention and that the invention may be incorporated in other structural forms than shown.

DESCRIPTION OF THE PREFERRED EMBODIMENT AS SEEN IN FIGS. 1 THROUGH 5

Figure 1:
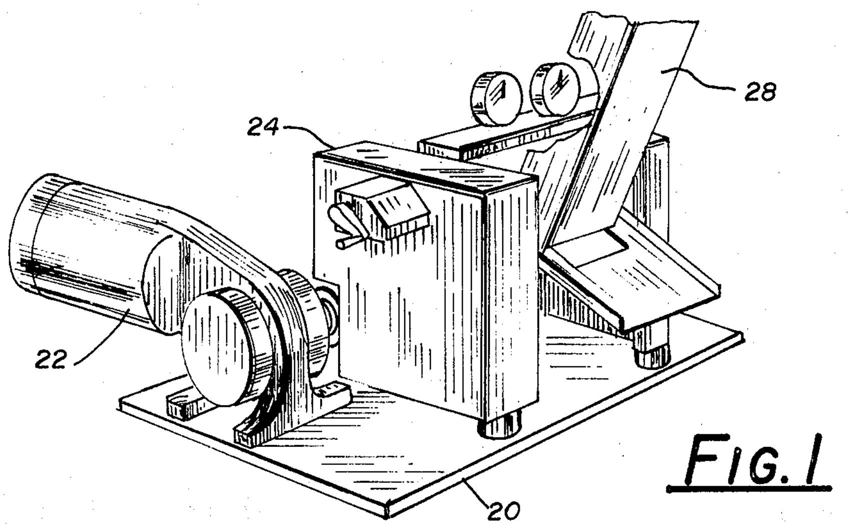
FIG. 1 represents a generally isometric view of the apparatus and showing in particular the arrangement of the electrical gear motor drive for operating the mechanism and also the infeeding chute which is partially broken away to show pressure indicating means carried on the top of the apparatus which enables correlation of the flattening dies of this invention.
Figure 2:
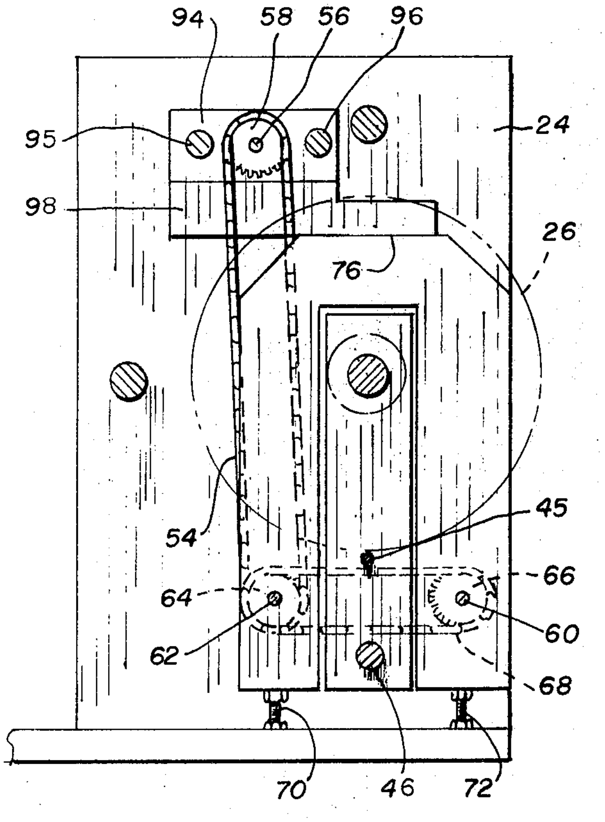
FIG. 2 represents a sectional view generally taken on the line 2—2 of FIG. 4 and showing in particular the arrangement of a chain drive by which one of the die supports is moved, this view being taken absent a feeding chute to the transport wheel.
Figure 3:
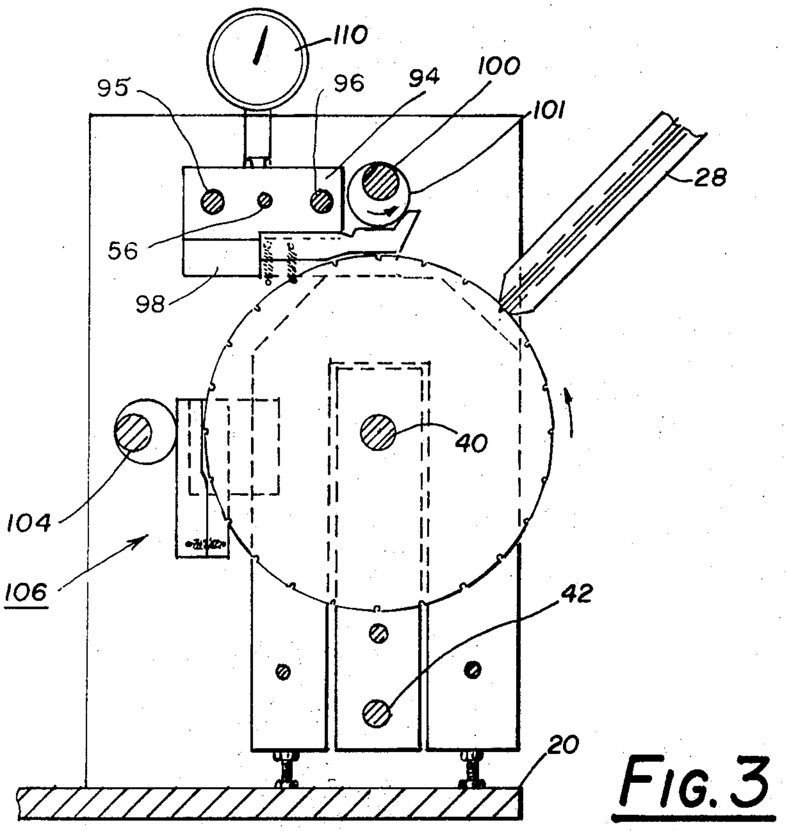
FIG. 3 represents a sectional view generally taken on the line 3—3 of FIG. 4 and showing the transport wheel as arranged to receive sequentially delivered unitary components being fed to the transport wheel and in particular to the relationship of a flattening die pair to the transport wheel and to subsequent cutting and/or forming operations.
Figure 5:
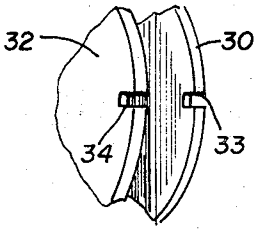
FIG. 5 represents a fractional isometric view showing the relationship of one transport flange portion to another transport flange portion of the transport wheel with notches arranged in these flanges for receiving and retaining the wire leads of the component.

Referring now in particular to the drawings and to the apparatus as seen in FIGS. 1 through 5, there is shown apparatus as carried on a base 20 and includes a gear motor 22 which drives a power train system within the apparatus framework 24. This power train provides intermittent motion to be imparted to a transporting wheel generally identified as 26, to be more fully described. As seen in FIGS. 1 and 3, a chute 28 is disposed to receive components in a single file array and deliver them to the transport wheel system 26 which includes circular flange members 30 and 32 as seen in FIG. 5. These flanges have notches 33 and 34 which are sized to receive and retain the leads of a component such as that shown in FIG. 9. For identification the component body is identified as 36 and the leads are identified as 37 and 38. The leads are a sliding fit in the notches 33 and 34 to permit easy entrance and egress from the notches. Each notch is sufficiently deep to retain the lead of a component as it is being processed.

As reduced to practice the flanges 30 and 32 are provided with twenty-four like-sized notches which are equally spaced on the periphery of these flanges.

Figure 4:
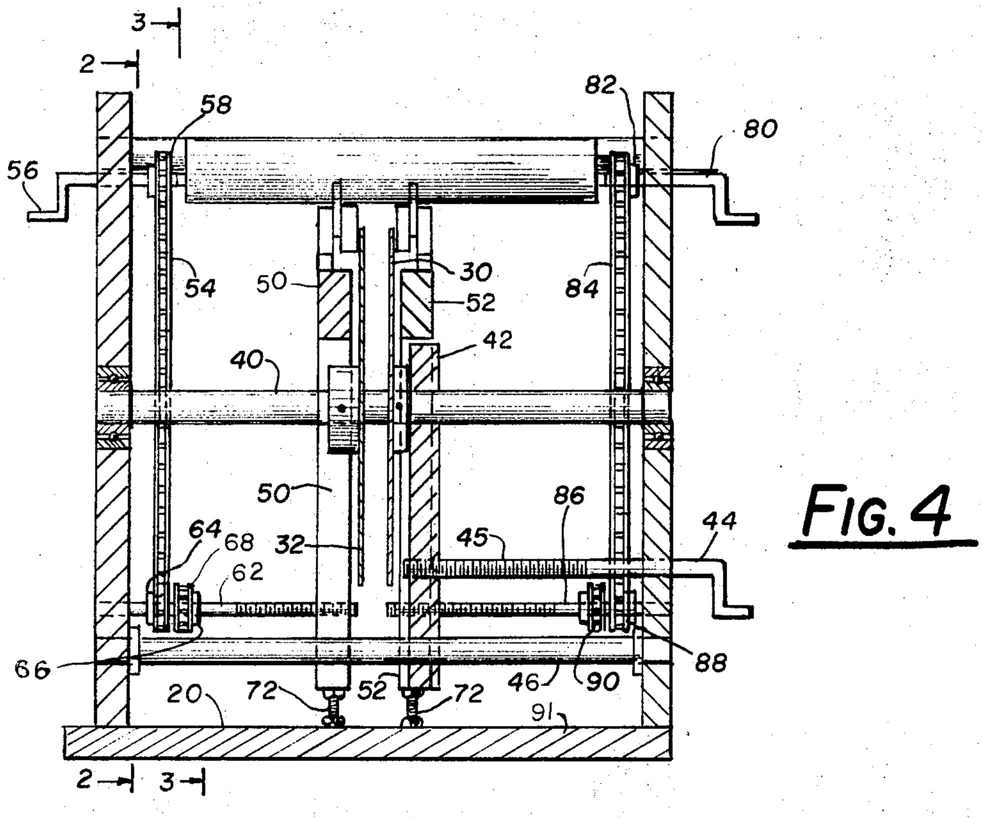
FIG. 4 represents a partly diagrammatic transverse sectioned view substantially along the center of the apparatus of FIG. 3.

Conventionally flange or disc 32, as seen in FIG. 4, is carried upon shaft 40 and is fixed to this shaft so as to be rotated therewith. This flange provides the fixed stop for one end of the component body. In like manner disc 30 is driven and carried by shaft 40 and rotated with the shaft. This disc is movable along the shaft by means of a guide block 42 which retains the disc 30 at its adjusted position. This block is movable back and forth by means of a crank 44 having a threaded end portion 45 carried by a threaded hole in the guide block 42. The rotation of crank 44 causes block 42 to move in and out to provide a desired width or spacing between the flanges 30 and 32. A bottom guide rod 46 carried by framework 24 slidably engages a bottom aperture in block 42 to prevent rotation and at the same time to provide a stablizing guide to the block as threaded end 45 is rotated. Flange 30 is adapted to rotate with shaft 40 while block 42 remains in its adjusted position.

A pair of like U-members 50 and 52 are provided with this apparatus with one disposed on the outside of each of the spaced wheels of the disc 30 and 32. U-member 50 is positioned to the outside of flange 32 and is moved in and out by means of a roller chain drive which includes a vertical chain 54 driven by means of a crank 56 and a sprocket 58 carried thereon. This chain by means of associated chain and sprockets drives a pair of shafts 60 and 62. Shaft 62 is driven by a sprocket 64 secured thereto. Said sprocket 64 is being driven by chain 54 while shaft 60 is driven by means of sprocket 66 secured thereto and driven by means of a connecting ladder chain 68. In the shown arrangement sprockets 58, 64 and 66 have a like number of teeth and chain 54 and 68 are alike so that as the crank 56 is rotated the two shafts 62 and 60 are rotated a like amount. The threaded inner ends of these shafts are carried in and engage threaded holes in U-member 50. The bottom portion of U-member 50 retains a pair of adjusting screws 70 and 72. In their adjusted condition these screws are carried a few thousandths of an inch above the upper surface of plate 20 by apparatus to be hereinafter described. During the flattening processing of the leads these screws engage the plate 20 for support. The upper portion of U-member 50 is formed with a supporting surface 76 for a purpose to be hereinafter more fully described. This surface has an established distance to the adjusting of the screws 70 and 72 for use with the flattening dies to be hereinafter more fully described.

U-member 52 is like, if not identical to, member 50 and is used with a flattening die to flatten and cut that lead extending from body 36 and extending rightwardly of flange 30 as seen in FIG. 4. Member 52 is moved to a desired position in response to flange 30 by a chain system like that for member 50. In the system used to move member 52 a crank 80 carries and drives sprocket 82 and engaged chain 84 which then drives screw shafts 86 and 87 by means of sprocket 88 and chain 90 which engage two sprockets 91 and 92. Sprocket 91 is carried on screw 86 and sprocket 92 is carried on shaft 87. The shaft 87 and sprocket 92 are concealed by shaft 86 and sprocket 91 in the view of FIG. 4. The screw shafts 86 and 87 are carried in threaded holes with one shaft moving each side of the downwardly extending U-member 52 in threaded holes provided therein. Adjusting screws 72 and 70 are also provided in the low end of U-member 52 in the manner of member 50.

Referring again in particular to FIG. 2, it is to be noted that a block 94 is carried upon a pair of guide rods 95 and 96. This block also has a threaded hole in which the threads of shaft 56 are engaged so that as the shaft is rotated this block and an attached portion 98 are moved along rods 95 and 96 and at the same time keep pace with the movement of the U-member 50. In like manner when the crank 80 is rotated a like block positioned above the U-member 52 is moved along these same rods 95 and 96 and the supporting block 98 engages the top of the U-member 52. To the right of block 94 is an eccentric shaft 100 carrying an eccentric portion 101 which may be a continuous member or may be separate members for engagement and actuation of a flattening die pair to be hereinafter more fully described. Substantially in a horizontal line with shaft 40 and to the left thereof, as seen in FIG. 3, is another eccentric shaft 104 which is driven by the same mechanism as drives the eccentric shaft 100. The eccentric shaft is adapted to actuate a forming and/or cutting die and generally indicated as 106 by which the flat leads may be secondarily cut or bent or both. As seen in FIG. 3 and turned nearly ninety degrees out of phase for the purposes of illustration is a dial indicator 110 carried by the frame 24 and having its movable plunger in engagement with the top of block 94 to render an indication to the operator of the machine as to the amount of deflection that occurs in shafts 95 and 96 with the downward movement of the block 94 during the flattening of the leads. This dial indicator reading gives an indication as to the pressure that is applied to the lead flattening operation with the eccentric shaft 100 and eccentric 101 thereon bearing most of the load.

THE DIE OF FIGS. 6, 7 AND 8

Figure 6:
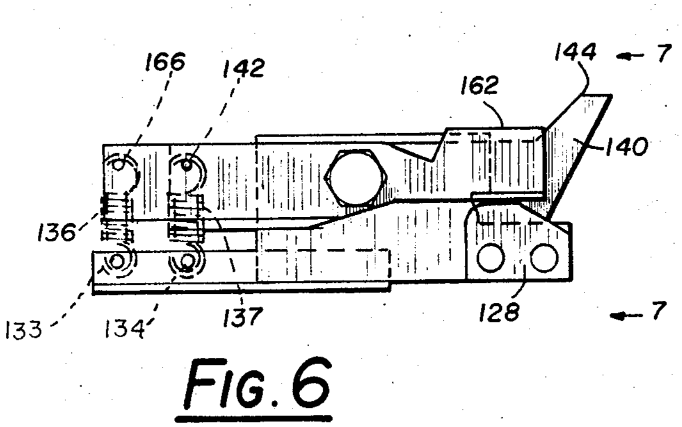
FIG. 6 represents a side veiw of one of the flattening die pairs of this invention, the die pair shown in a closed condition and assembled for mounting and use.
Figure 7:
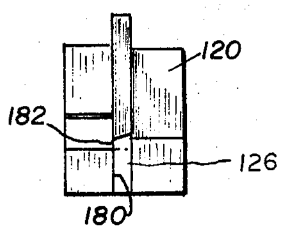
FIG. 7 represents an end view of the die assembly of FIG. 6, this view taken on the line 7—7 of FIG 6.
Figures 8, 9, 10:
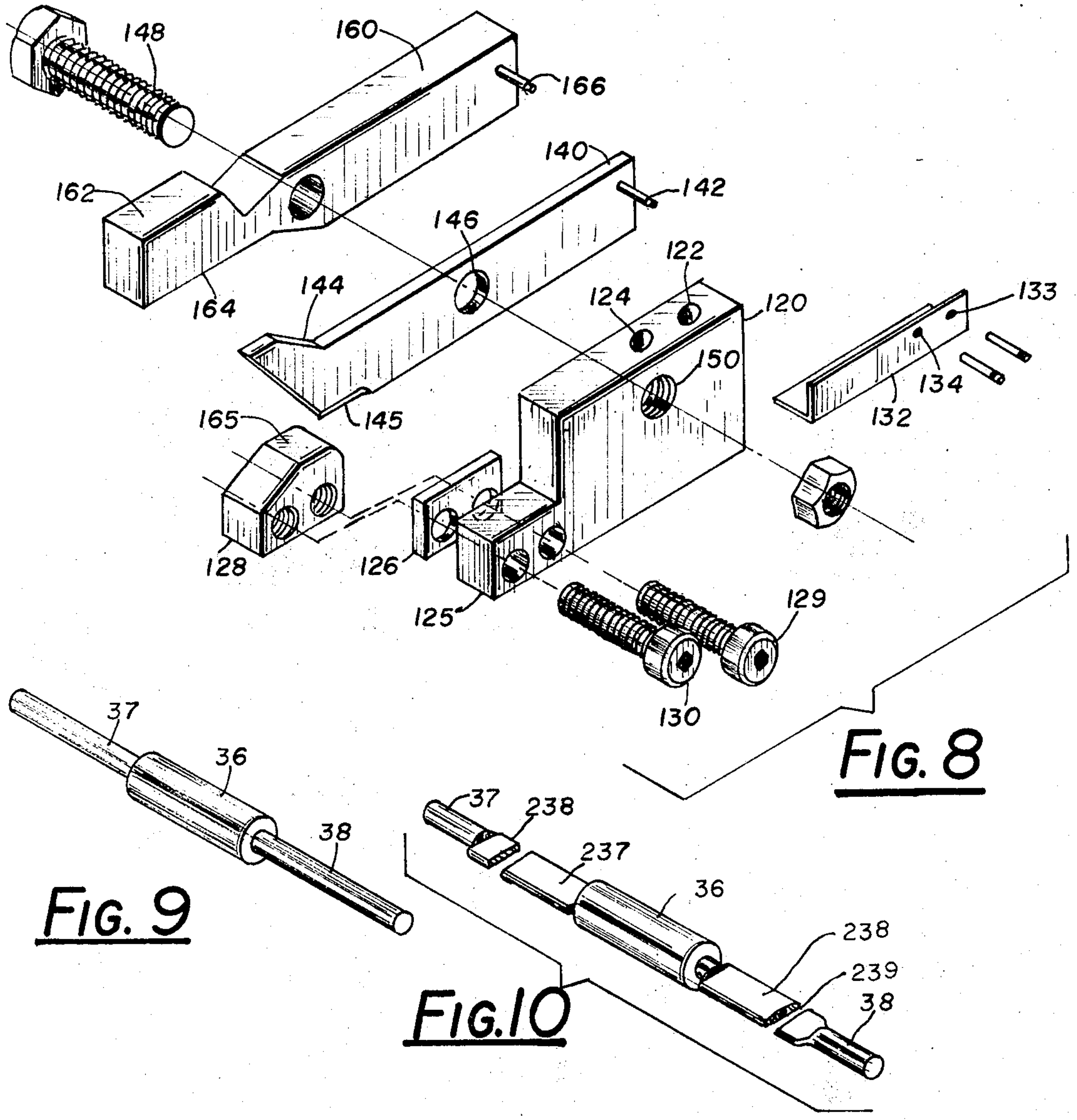
FIG. 8 represents an exploded isometric view of the die pair of FIG. 6 and showing in particular the relationship of the several components to each other.
FIG. 9 represents an iosmetric view of a typical electrical component prior to the processing of its wire leads.
FIG 10 represents an isometric view of the component of FIG. 9 after the leads have been flattened and severed by the die pair of FIG. 6 and prior to delivery to subsequent operations.

Referring now to the drawing in which is shown the flattening die pair assembly as seen both assembled and in exploded view in FIGS. 6, 7 and 8. It is to be noted that the die pair as depicted is adapted to cut the lead 38 of the component seen in FIG. 9. A base block 120 is provided with threaded holes 122 and 124 by which it is attached to block 94 and is carried thereby. Integrally attached to the block is a forwardly extending shelf portion 125. Adjacent the left face of shelf 125 is lower spacer 126 and adjacent the spacer is lower flattening die member 128. Member 128 and spacer 126 are secured to shelf 125 by means of cap screws 129 and 130. A support bracket 132 has a pair of holes 133 and 134 formed therein. These holes are adapted to provide retaining means for the lower end of springs 136 and 137 as diagrammatically depicted in FIG. 6.

A knife cutter bar 140 is provided with a mounted extending pin 142 to which the upper end of spring 137 is attached. The other end of this cutter bar has a forward ramp 144 and intermediate these ends is pivotally supported on a hole 146 by means of a bolt 148. The threaded end of this pivot shaft and bolt extends through threaded hole 150 in block 120. Also carried by pivot bolt 148 is the upper flattening die arm 160 which includes a drive surface 162 and the lower anvil portion 164 which is adapted to mate with the flat surface 165 of attached member 128 to provide the flattening means. In its assembled condition the bar 160 is rotatable around pivot bolt 148 as is the cutter bar 140. Extending pins 142 on member 140 and 166 on member 160 are actuated by the attached tension spring so that bar 140 and arm 160 by means of the attached springs cutting bar 140 is urged to an upper position such as seen in FIG. 7. In this position a small gap is provided between and above the die surface 165 on which a lead rests to be flattened and the cutting edge 145 of the knife is also above this lead wire. In a like manner spring 136 urges the flattening bar 160 to an open condition as is seen in FIG. 7 as and until the lead 38 is brought into the die pair for flattening and then cutting.

OPERATION OF THE LEAD FLATTENING DIE PAIR

It is to be noted that the eccentric 101 as it rotates counterclockwise is brought in way of the arm 160 as seen in FIG. 6 and engages surface 162 to urge the member 160 downwardly clockwise around pin 148. This movement brings the surface 164 toward surface 165 to a determined spacing and with lead 38 therebetween a flattening of the lead 38 to a condition as seen in FIG. 10 and identified as 238. After the lead has been flattened to the desired thickness it is severed by knife 140 as it brings cutting edge 145 to and past the facing surface of block 128 which is a hardened tool steel block. This surface, as seen in FIG. 7, is identified as 180 and the cutting knife edge as 182. The cam portion 144 of cutter bar 140 is engaged by the eccentric 101 as it continues its rotation and this causes the knife bar to be actuated in a sequential motion to the flattening of the lead to cause this lead to be cut at a line 239. In a like manner a mirror image flattening and cutting die pair is used with the U-member 50 to cause the lead 37 to be flattened and cut. The opposite side die pair has the same type of components. It is readily apparent that die member 128 and cutter bar 140 as well as upper die arm 160 may be replaced or repaired by inserting certain types of hardened metal material and sharpening. However, it has been found in reduced to practice processing that tens of thousands of components may be flattened and cut to length without reconditioning or repositioning of the dies. The U-bar members 50 and 52 are carried on rods 95 and 96 through attachment of block 94 to member 98. Adjusting screws 70 and 72 are manipulated to position the U-members 50 and 52 as they support the die bottom portions of block 120 and die member 128 as the eccentric shaft 100 and eccentric 101 drives the flattening arm 160 downwardly to effect the positioning of the die surface 164 with surface 165 to squeeze the lead 238 to the desired thickness.

Terms such as "left," "right," "up," "down," "bottom," "top," "front," "back," "in," "out," "clockwise," "counterclockwise" and the like are applicable to the embodiment shown and described in conjunction with the drawings. These terms are merely for the purposes of description and do not necessarily apply to the position in which the apparatus for flattening and trimming the leads of electrical components may be constructed or used.

While a particular embodiment of the flattening die and associated apparatus has been shown and described it is to be understood the invention is not limited thereto since modifications may be made within the scope of the accompanying claims and protection is sought to the broadest extent the prior art allows.

What is claimed is:

1. In an apparatus for processing leads which are axially arranged on an electrical component wherein at least one substantially round wire lead is flattened to provide a determined thickness, said apparatus including: (a) a frame including a base for the apparatus; (b) means for feeding in a single file array and delivering to a receiving means carried by the frame a supply of axially arranged electrical components; (c) a transport means carried by the frame and adapted for receiving the delivered electrical components one at a time and with an intermittent motion carrying each component and its attached leads in a predetermined path; (d) a die pair carried by the frame, said die pair having opposed hammer and anvil surface members, the die pair while and when in an open condition disposed to receive an unflattened lead component moved between the opposed surfaces of the hammer and anvil, this lead retained there during a pause in the intermittent transport of the component; (e) means for supporting the anvil member and for moving the hammer surface member a determined distance toward the anvil member to flatten the lead therebetween to produce a selected lead thickness during this pause in the transport of the component; (f) means for opening the die pair to the open condition prior to moving the transport and component with its flattened lead so as to remove this lead from the die pair and further in its transport path for further operations, and (g) means for discharging the component with its processed leads from the apparatus.

2. Apparatus for processing axial electrical components as in claim 1 in which the means for feeding the components in a single file array to the receiving means is a chute which is arranged in a sufficiently vertical condition to provide gravity flow of the components, said chute arranged to slidably engage and retain the wire leads and to slidably engage the ends of the body of the components as they are fed down the chute.

3. Apparatus for processing axial electrical components as in claim 1 in which the transport means includes two circular flange members carried on and rotated with an intermittently rotated shaft, the flanges spaced to slidably engage and retain each end of an electrical component fed thereto and with each flange having a plurality of equally spaced notches formed in its periphery, the notches of one flange aligned with the other flange and each notch sized so as to slidably engage and retain a wire lead of an electrical component.

4. Apparatus for processing axial electrical components as in claim 3 in which one flange is fixed to the shaft and the other flange is rotatably retained by a key and keyway on the shaft so as to be selectively slidable along the shaft to establish a different spacing between the flanges whereby a run of components having body lengths which although of like length are as a group of a length different than the prior run, this newly established spacing remaining for the length of run of components which have their ends slidably engaged by the flanges.

5. Apparatus for processing axial electrical components as in claim 4 in which the rotation of the flanged transport means is arranged to receive the electrical components from a gravity chute at a position which is prior to a top position and from this receiving position to transport each component to a position whereat the component is substantially at the top of its rotative path and at this top position the flattening operation of the leads does occur.

6. Apparatus for processing axial electrical components as in claim 1 in which the die pair includes a base block which is adjustably carried on a support means carried by the frame, the base block carrying the anvil member; a die arm pivotally carried on and by the base block, the die arm having a hammer face which in a mounted condition is disposed opposite the anvil face and in which the means for moving the anvil face is an associated eccentric drive driven by a power means in timed relationship with the transport wheel.

7. Apparatus for processing axial electrical components as in claim 6 in which the die pair further includes a cutter bar which is pivotally carried on the base block, said cutter bar being actuated by an eccentric means and timewise immediately subsequent to the actuation imposed on the die arm to flatten the lead wire.

8. Apparatus for processing axial electrical components as in claim 7 in which the pivot means for both the cutter bar and the die arm is a bolt carried by the base block and in which a bias means is provided to urge the cutter bar and the die arm to the open condition.

9. Apparatus for processing axial electrical components as in claim 8 in which the bias means are two tension springs, one of which has one end attached to the cutter bar and the other end attached to means associated with the base block and the other spring has one end attached to the die arm and its other end attached to means associated with the base block.

10. Apparatus for processing axial electrical components as in claim 7 in which the anvil member is removably carried by the base block and has one face finished so that in a mounted condition it will cooperate with the cutter bar and its cutting edge to cut the flattened lead substantially at the outer end of the flattened lead area.

11. Apparatus for processing axial electrical components as in claim 6 in which there are two die pairs, each pair carried on rail means for selective adjustment to and from the outside of the flange with which it is associated.

12. Apparatus for processing axial electrical components as in claim 11 in which each die pair is attached to and carries a U-member which provides the means for supporting the anvil member, each U-member being positioned and adapted to engage the base and be supported thereby while and when the lead flattening operation occurs.

13. Apparatus for processing axial electrical components as in claim 12 in which the U-members include at least two screw jacks which are adjusted so as to be a few thousandths of an inch above the base until the lead flattening action occurs whereupon with the flattening pressure the screw jacks move to the base to support the die pair anvil.

14. Apparatus for processing axial electrical components as in claim 13 in which the adjustment of a die pair and the U-member which it carries is by a plurality of screw members carried by the frame and the die pair support, the screw members cooperatively connected so that simultaneous actuation of said screw members is provided by a selective control means.

15. Apparatus for processing axial electrical components as in claim 14 in the cooperative connection of the screws in a roller chain and sprocket system for each die pair and associated U-member which system includes a crank for manipulative positioning of the die pairs.

16. Apparatus for processing axial electrical components as in claim 10 in which there is associated with the transport wheel a subsequent die pair which is actuated to perform a later lead processing operation prior to discharge from the apparatus.

* * * * *